United States Patent [19]

Wansor et al.

[11] Patent Number: 5,523,108

[45] Date of Patent: Jun. 4, 1996

[54] UNSWEETENED FROZEN TEA BEVERAGE CONCENTRATE

[76] Inventors: Gerard J. Wansor, 15 William Close, Warwick, N.Y. 10990; Douglas E. Murray, 38 Dale Rd., Hopewell Junction, N.Y. 12533; Robert R. Gale, 16 Riverbank Ct., New Canaan, Conn. 06840

[21] Appl. No.: 451,363

[22] Filed: Aug. 26, 1995

Related U.S. Application Data

[63] Continuation of Ser. No. 876,539, Apr. 30, 1992, abandoned.

[51] Int. Cl.$^6$ .................................................. A23F 3/00
[52] U.S. Cl. ................................. 486/597; 426/330.3
[58] Field of Search .................... 426/597, 330.3

[56] References Cited

U.S. PATENT DOCUMENTS

| | | | |
|---|---|---|---|
| 4,717,579 | 1/1988 | Vietti et al. | 426/597 |
| 4,748,033 | 5/1988 | Syfert et al. | 426/597 X |

*Primary Examiner*—Anthony J. Weier

[57] ABSTRACT

Unsweetened tea beverage concentrates containing from 0.5 to 10% by weight of tea solids are made freeze-thaw stable (i.e., resistant to the formation of insoluble particles) by the addition of at least 2%, preferably 2 to 4%, by weight of water-soluble carbohydrate materials, such as sugars and/or hydrolyzed starch solids.

10 Claims, No Drawings

UNSWEETENED FROZEN TEA BEVERAGE CONCENTRATE

This application is a continuation, of application Ser. No. 07/876.539, filed Apr. 30, 1992, abandoned.

TECHNICAL FIELD

The present invention relates to unsweetened, frozen tea beverage concentrates which do not develop insoluble particles as a result of a freeze-thaw cycle. Unsweetened tea beverages are preferred by a number of consumers basis either taste preference or dietary concerns. Tea beverages may be supplied to consumers either as a single-strength beverage ready for consumption or as a concentrate which must be diluted with water prior to consumption. Concentrates are sold primarily to foodservice or institutional customers, rather than directly to the consumer.

Many consumers prefer that the tea beverage have a fresh brewed flavor. Preserving fresh brewed flavor in a liquid tea beverage or beverage concentrate is difficult. By contrast, freezing the liquid tea beverage or beverage concentrate would permit the preservation of fresh brewed flavor.

It has been found however that unsweetened tea beverage concentrates develop insoluble, brownish-colored particles upon passing through even a single freeze-thaw cycle. The insoluble particles can be readily seen in tile single-strength beverages which are produced from the thawed concentrates. These particles are believed to result from a complexing reaction between caffeine and polyphenol compounds.

U.S. Pat. No. 4,717,579 to Vietti et al. discloses a frozen, sweetened tea beverage concentrate which contains from 40% to about 70% by weight of sugars and is flowable at freezer temperature. Frozen, unsweetened tea beverage concentrates, or frozen, unsweetened tea beverages are not known to be commercially available.

SUMMARY OF THE INVENTION

An aqueous, unsweetened tea beverage concentrate, stable through freeze-thaw cycling (i.e., does not form insoluble particles), is prepared by adding to the tea beverage concentrate water-soluble carbohydrates at a level which is at least 2%, basis weight of the concentrate and which is below the level which imparts a sweet taste to the tea beverage prepared from the concentrate. The water-soluble carbohydrates used in the frozen tea beverages or beverage concentrates of the present invention typically include the monosaccharides, such as fructose and dextrose (glucose), the disaccharides such as sucrose, maltose and isomaltose, trisaccharides such as maltotriose, and isomaltotriose and/or other polysaccharides normally present in corn syrups, maltodextrins and dextrins.

DETAILED DESCRIPTION OF THE INVENTION

This invention is particularly useful in the preparation of frozen, unsweetened tea beverage concentrates which are formulated to be diluted with water at a ratio of at least 5:1 (by volume). Most frozen tea concentrates are utilized in food service operations and are used in beverage dispensing equipment where the thawed concentrate is combined with water just prior to dispensing. The presence of insoluble particles is, therefor, a problem not only with respect to appearance of the beverage and possible loss of flavor from the beverage but also with respect to operation of the beverage dispensing equipment. Insoluble particles in the concentrate will increase equipment down time or maintenance time as these particles can clog filters, solenoids and nozzles.

By means of this invention it is possible to produce commercially-acceptable, frozen unsweetened tea beverage concentrates which are used at a water to concentrate ratio (by volume) of from 5–20:1. Most beverage concentrates in the food service industries are formulated for use a 5–12:1 water to concentrate ratio. Obviously the higher the dilution ratio, the lower will be the relative cost of shipping, storing and handling the concentrate.

The source of tea solids for the frozen tea beverage and beverage concentrates of the present invention can be dried (e.g., spray-dried) tea extract or liquid, preferably concentrated tea extract or a combination thereof. The tea extracts used can be obtained from fermented or unfermented tea, e.g., black tea, oolong tea, green tea, or mixtures thereof. Enzyme-treated tea leaves are thought to provide a higher yield of tea extract which has better solubility in cold water.

The tea leaves, with or without pretreatment with enzymes, can then be extracted in a conventional manner to provide the tea extract. See Pintauro, Tea and Soluble Tea Products Manufacture (1977), pp. 39–81 (herein incorporated by reference), for various methods of obtaining tea extract from tea leaves. The tea leaves are typically slurried with water followed by separation of the leaves from the resulting tea extract. This extraction can be performed in a single batch fashion, as a continuous process, as a countercurrent multiple vessel process, or any combination thereof. Continuous countercurrent tea extraction is the most preferred method. Chelating agents such as EDTA and the polyphosphates can be added to the extraction water to sequester undesirable minerals such as calcium and magnesium typically present in hard water and tea leaves. If desired, tea aroma and flavor components (e.g., distillates) can be volatilized from the extract, collected, condensed and added back at a later point in the process. A tea extraction process which avoids harsh tea flavors and preserves real tea flavor is desirable.

The tea extract resulting from slurry or countercurrent extraction of tea leaves produces a turbid beverage when diluted with cold water. Typically, the tea extract is clarified by cooling to separate solids which form in a decreaming step. Removal of tea creams is typically achieved by centrifugation, filtration or other suitable means. Depending upon the desired tea solids concentration in the tea mix concentrate, the extract can be further concentrated by suitable methods such as evaporation or reverse osmosis. See Pintauro, supra, pp. 82–141 (herein incorporated by reference), for various representative methods for decreaming, filtering and concentrating tea extracts. Clarification may be effected either before or after a concentration step. When the extract is to be spray-dried, it is usually concentrated to a solids level of about 20 to 35% by weight.

The water-soluble carbohydrates of this invention and any desired preservative, such as sodium benzoate, colors and flavors are then added to the processed tea extract. This tea extract is preferably pasteurized or sterilized prior to packing in sterile containers. Any heat-sensitive flavoring, such as lemon oil, is preferably added to the heat-treated tea extract, which is then chilled to provide a frozen tea beverage or beverage concentrate product.

The level of tea solids present in the concentrates of this invention may be about 0.55 to 10% (by weight). More typical levels will be from 1 to 5% by weight of the concentrate. A higher level of tea solids will be needed if the concentrate does not contain any natural or synthetic tea aromas or flavors. Of course, the higher the desired dilution ratio of water to concentrate, the higher the level of tea solids which should be present in the concentrate.

The level of added water-soluble carbohydrates will be at least 2% by weight of the concentrate. For tea concentrates formulated to be diluted with water at a 20:1 ratio, carbohydrates can be added to the concentrate at a level of up to 30% by weight. In all cases, however, the level of added carbohydrates is below the level which would impart a sweet taste to the single-strength beverage produced from the concentrate. Typical levels of added carbohydrates will be from 2 to 10%, more typically 2 to 4% by weight of the concentrate.

The water-soluble carbohydrates can include sugars (i.e., sweet-tasting mono and disaccharides), and higher saccharides. Hydrolyzed starch solids such as corn syrup solids, dextrins and maltodextrins are also useful in this invention. Hydrolyzed starch solids having a D.E. of less than 42, preferably less than 36, and most preferably less than 15 are preferred for use in this invention. Lo-Dex® 10, a bland-tasting, enzyme-converted, 10 D.E. maltodextrin available from American Maize Products Company (Hammond, Ind.), has proven to be quite effective for use in this invention.

The benefit of the present invention has been established in a series of tests wherein unsweetened tea concentrates were frozen and held at −17.8° C. (0° F.) and thereafter thawed and passed thru filter paper. The amount of brown insoluble particles which remained on the surface of the filter paper was qualitatively assessed. These results are set forth in the following example.

EXAMPLE

An unsweetened tea beverage concentrate formulated for an 11:1 dilution ratio were prepared as follows:

| Ingredient | Weight % |
| --- | --- |
| Water | 90.6 |
| Maltodextrin (Lo-Dex 10) | 2.7 |
| Spray Dried Tea Solids (clarified) | 1.4 |
| Tea Flavors/Colors | 5.0 |
| Preservatives/Vitamin C | 0.3 |

The concentrate was frozen and held at −17.8° C. (0° F.), thawed at room temperature and then passed through filter paper. The paper evidenced slight, brownish discoloration as a result of retained insolubles. An equal volume of tea concentrate was prepared as above but without the maltodextrin component. When this maltodextrin-free concentrate was filtered the level of retained insolubles was several fold greater.

Equally dramatic differences were obtained when filtering thawed concentrates prepared as above but utilizing spray dried tea solid from unclarified tea extract. In this case, however, the level of retained solids were much higher than for the unclarified versions versus its clarified counterparts.

Concentrates prepared for a 15:1 and 20:1 dilution ratios were also found to evidence dramatic differences in the amount of brown insoluble material retained on filter paper when comparing the presence and absence of 2.7% Lo-Dex 10.

Having thus described the invention, what is claimed is:

1. An aqueous, frozen, unsweetened, tea beverage concentrate consisting essentially of tea solids at a level of at least 0.5%, flavor, color and added water-soluble saccharide at a level which is effective to reduce the amount of undissolved particles which develop in the tea concentrate as a result of a freeze-thaw cycle, said saccharide level being from 2 to 4% by weight of the tea concentrate and below the level which will impart a sweet taste to a single-strength beverage prepared from the concentrate, and said saccharide being selected from the group consisting of sugars, hydrolyzed starch solids and combinations thereof.

2. The frozen tea beverage concentrate of claim 1 wherein the water-soluble saccharide consist of hydrolyzed starch solids having a D.E. of less than 42.

3. The frozen tea beverage concentrate of claim 2 wherein the D.E. is 36 or less.

4. A frozen tea beverage concentrate in accordance with claim 1 wherein the level of tea solids is from 0.5% to 10%.

5. The frozen tea beverage concentrate of claim 1 which further contains tea aroma distillate.

6. The frozen tea beverage concentrate of claim 1 which contains reconstituted dried tea solids.

7. The frozen tea beverage concentrate of claim 6 wherein the tea solids are obtained by drying a clarified tea extract.

8. The frozen tea beverage of claim 1 which contains fresh brewed tea extract.

9. The frozen tea beverage concentrate of claim 8 wherein the extract is a clarified tea extract.

10. The frozen tea beverage concentrate of claim 1 wherein the level of added water-soluble carbohydrates is from 2% to 4% by weight.

* * * * *